UNITED STATES PATENT OFFICE.

JAMES E. LAPPEN, OF WINONA, MINNESOTA, ASSIGNOR TO UNION FIBRE COMPANY, OF WINONA, MINNESOTA, A CORPORATION OF MINNESOTA.

COMPOSITION OF MATTER FOR MAKING FIREPROOF AND WATERPROOF BOARDS.

1,226,779. Specification of Letters Patent. Patented May 22, 1917.

No Drawing. Application filed April 23, 1913. Serial No. 763,042.

*To all whom it may concern:*

Be it known that I, JAMES E. LAPPEN, a citizen of the United States, residing at Winona, in the county of Winona and State of Minnesota, have invented a new and useful Composition of Matter for Making Fireproof and Waterproof Boards, of which the following is a specification.

The object of the invention is to furnish an improved composition for the production of boards which will have characteristics which enable them to be effectively used as a substitute for wooden shingles and boards and slate tiles in the construction of buildings.

The materials which enter into the present composition of matter are all mineral, so that the resultant product is, of course, fire proof, and it is also practically water proof. In the prior art artificial stone shingle plates have been made out of hydraulic cement and asbestos mixed with water and compacted under heavy mechanical pressure, but such plates are too heavy and brittle and do not have the requisite flexibility to make them a satisfactory substitute for shingles. They have the characteristics of stone rather than of board, and therein differ from the boards produced by the composition which forms the subject of the present invention.

In making the boards I use the following ingredients combined in approximately the proportions stated, namely: cement, preferably hydraulic, about 600 pounds, mineral wool about 200 pounds, alum about 7 pounds, and preferably asbestos about 30 pounds.

In preparing the composition the asbestos, when the same is used, is first put in water and beaten until the fibers are separated. The cement is next added, then the mineral wool, and lastly the alum. The mixture is then agitated just enough to mix the ingredients thoroughly together. It is best not to put the mineral wool into the liquid until after the asbestos fibers are thoroughly separated, because it is brittle and will be crumbled up like glass if subjected to the heating necessary to separate the asbestos fibers. If desired a suitable coloring agent can be added to the mixture, and the mineral wool may be smoked or oiled. Enough water is used to make the mixture run or "travel."

After the ingredients have been thus mixed, the water is drawn off and the sloppy mixture is subjected to rolling, tamping, or pressing in order to expel the water therefrom. It can be rolled or formed into sheets of any desired thickness, or it can be built up in sheets upon an ordinary cardboard machine. After the water has all been expelled the sheets are allowed to set and dry. They can then be cut out or sawed into suitable lengths and sizes for shingles or boards.

I prefer to use asbestos as one of the ingredients as asbestos adds strength and toughness to the composition and prevents it from sticking to the rolls or other pressure instrumentalities.

The use of alum is essential as it brings the cement particles into intimate association with the mineral wool fibers and causes them to adhere to the fibers instead of settling to the bottom. The fibers thus become coated over with adherent cement, so that, as soon as the water is squeezed out of the mixture, the cement will set and bind the fibers together interiorly. This makes it unnecessary to subject the sheets to external mechanical pressure, as is now done with the asbestos and cement plates, in order to force the cement into close association with the fibers.

On account of the character and intimate association of the ingredients, the boards thus formed are light and tough, and have sufficient flexibility and resiliency to allow them to be lapped and nailed to a wall or roof like shingles without breaking or cracking at the bend; and nails can be driven through them without the drilling of nail holes and without danger of the nails cracking, splitting, or chipping the board. The boards are particularly adapted to outside use as they do not disintegrate or deteriorate under exposure to the weather.

It will be understood that the proportions of the ingredients as hereinbefore stated can be varied within certain slight limits without materially changing the character of the product, but the best results are attained by using the ingredients in the proportions I have given.

I claim as my invention:

A composition of matter for making fibrous fireproof boards consisting of thirty parts of separated asbestos fibers, six hundred parts of hydraulic cement, two hundred parts of mineral wool added after the separation of the asbestos fibers, and seven parts of alum.

In testimony whereof I affix my signature in presence of two witnesses.

JAMES E. LAPPEN.

Witnesses:
ARTHUR P. LOTHROP,
H. SWANSON.

Copies of this patent may be obtained for five cents each, by addressing the "Commissioner of Patents, Washington, D. C."